Sept. 19, 1961 W. J. STROH 3,001,014

SYNCHRONIZING-SIGNAL SEPARATOR

Filed July 14, 1958

INVENTOR
Walter J. Stroh
BY Francis W. Crotty
ATTORNEY

United States Patent Office
3,001,014
Patented Sept. 19, 1961

3,001,014

SYNCHRONIZING-SIGNAL SEPARATOR

Walter J. Stroh, Barrington, Ill., assignor to Zenith Radio Corporation, a corporation of Delaware Filed July 14, 1958, Ser. No. 748,397
7 Claims. (Cl. 178—7.3)

Figure 1:
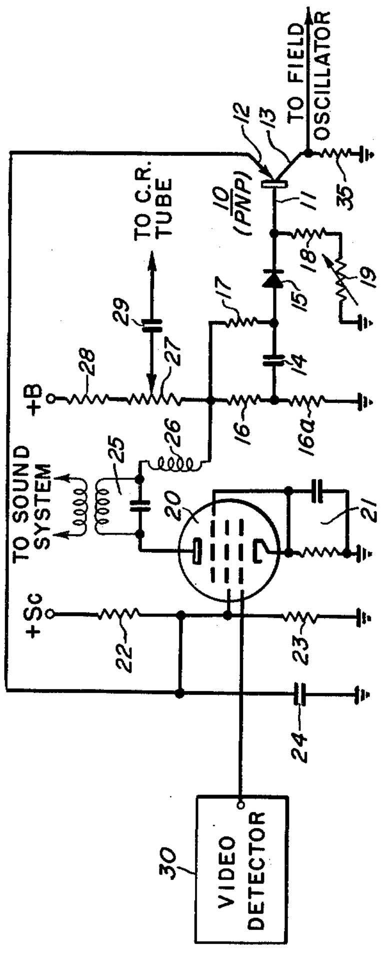

This invention is directed to a new and improved synchronizing-signal separator for a television receiver.

Synchronizing-signal separation for receiver apparatus intended to utilize television signals conforming to current specifications of the Federal Communications Commission is most easily accomplished on the basis of discrimination as to pulse duration. This results from the fact that the signal specifications prescribe a certain pulse duration for line-synchronizing components and a very much longer duration for field-synchronizing pulses. Viewed from that standpoint, a synchronizing-signal separator may be characterized as a pulse-discriminating device.

A novel form of pulse-discriminating arrangement is described and claimed in copending application of Jean G. Isabeau, Serial No. 748,376, filed July 14, 1958, and assigned to the same assignee as the present invention. That discriminator takes advantage of certain properties of semi-conductor or transistor devices which distinguish such devices from vacuum tubes. More specifically, discrimination is achieved by reliance upon a charge-storage phenomenon exhibited by semi-conductor devices. In brief, the charge-storage time of a semi-conductor, which may be controlled to at least a certain extent by operating bias, is adjusted to exceed the duration of the line-synchronizing pulse and yet to be short with respect to each of the several pulses which collectively constitute the serrated field-synchronizing component of a composite television signal. The transistor is operated in a condition of base-collector saturation and the television signal is applied to the base electrode with the synchronizing signals poled to drive the transistor to cut off. In the presence of a line-synchronizing component, the transistor is driven toward cut off and the collector tends to follow the potential change of the base because it is, in effect, shorted to the base in the saturation condition. However there is no separation of the line signal in the collector circuit from the remainder of the applied signal for the simple reason that the storage time of the transistor is longer than the duration of the line-synchronizing component. When the serrated-field component is received, however, each pulse thereof lasts longer than the storage time of the transistor and results in developing an effectively separated field component in the collector circuit.

This type of discriminator, in accordance with the one embodiment of the Isabeau application, may be A.C. coupled to the video amplifier which is highly desirable. This, of course, necessitates the use of a stabilizing circuit to establish the television signal, as applied to the base electrode of the transistor, at some desired reference amplitude level in order to free the circuit from signal fluctuations representing video information. Stabilizing circuits of this type, employing a coupling condenser series connected with a diode, are well-known in the art. They are frequently used, for example, in synchronizing-signal stabilization in monochrome television receivers employing A.C. coupling from the video amplifier to the cathode-ray image reproducer. While such a stabilizing circuit is largely free from the influence of video content, it is subject to slow changes in the average level of the applied signal. Accordingly, when it is employed to supply the television signal to the base electrode of the transistor serving as a signal separator, the average level of the base electrode changes somewhat with variations in picture brightness and this causes an undesirable change in the operating potentials of the transistor.

The present invention is a further development of that type pulse discriminator or synchronizing-signal separator and is directed to freeing the separator from variations in picture brightness, even where the transistor is A.C. coupled to the video amplifier. Accordingly, it is an object of the invention to provide a novel and improved synchronizing-signal separator for television receivers in which separation is accomplished in a transistor circuit.

It is a specific object of the invention to provide a synchronizing-signal separator of the transistor type in which a signal is applied to the transistor through a stabilizing circuit but which, at the same time, is relatively free of potential variations otherwise experienced due to changes in picture brightness.

Another particular object of the invention is to energize a transistor-type signal separator with a varying component of D.C. potential which compensates for otherwise adverse effects of a signal-stabilizing circuit which applies the television signal to the separator and which is subject in some degree to changes in picture brightness.

A synchronizing-signal separator, constructed in accordance with the present invention for inclusion in a television receiver, comprises a transistor including a semiconductor body having two conductivity zones of one type and another conductivity zone of opposite type collectively constituting base-emitter and base-collector junctions. The transistor has a charge-storage characteristic dependent upon operating bias and also has base, emitter and collector electrodes coupled in signal-translating relation to its junctions. Potential supply means are provided for applying operating bias to the transistor to establish a saturation condition at the base-collector junction and, also, to establish in the transistor a charge-storage time which is long relative to the line-synchronizing components of a television signal, but short relative to each of the several pulses comprising the serrated field-synchronizing components of that signal. The potential supply includes means for applying to one of the electrodes of the transistor a D.C. potential which varies in a particular way with the video content of the television signal. A signal-stabilizing means, including a coupling condenser and a series-connected diode, applies a television signal to the base electrode of the transistor with a polarity and amplitude to bias the transistor to cut off in the presence of synchronizing components. The effect of the stabilizer is to fix or stabilize the television signal with respect to a reference amplitude level, but it is subject to variations with video content in a manner which is compensated by the aforesaid variations of the potential-supply means. A load impedance is connected in series with the emitter or collector electrode to derive at least one of the two types of synchronizing components effectively separated from the other.

In accordance with one feature of the invention, the emitter electrode is energized from the screen electrode of the video amplifier which drives the synchronizing-signal separator. In this fashion, the emitter is subject to the same type of potential variations that the signal-stabilizing circuit imposes on the base electrode to the end that the net potential across the transistor is independent of picture content.

In accordance with another feature of the invention, a variable component of D.C. potential is obtained from the video detector and is applied to the base of the transistor along with the stabilized television signal to annul or compensate potential changes of the stabilized signal attributable to variations in picture brightness.

Figure 2:
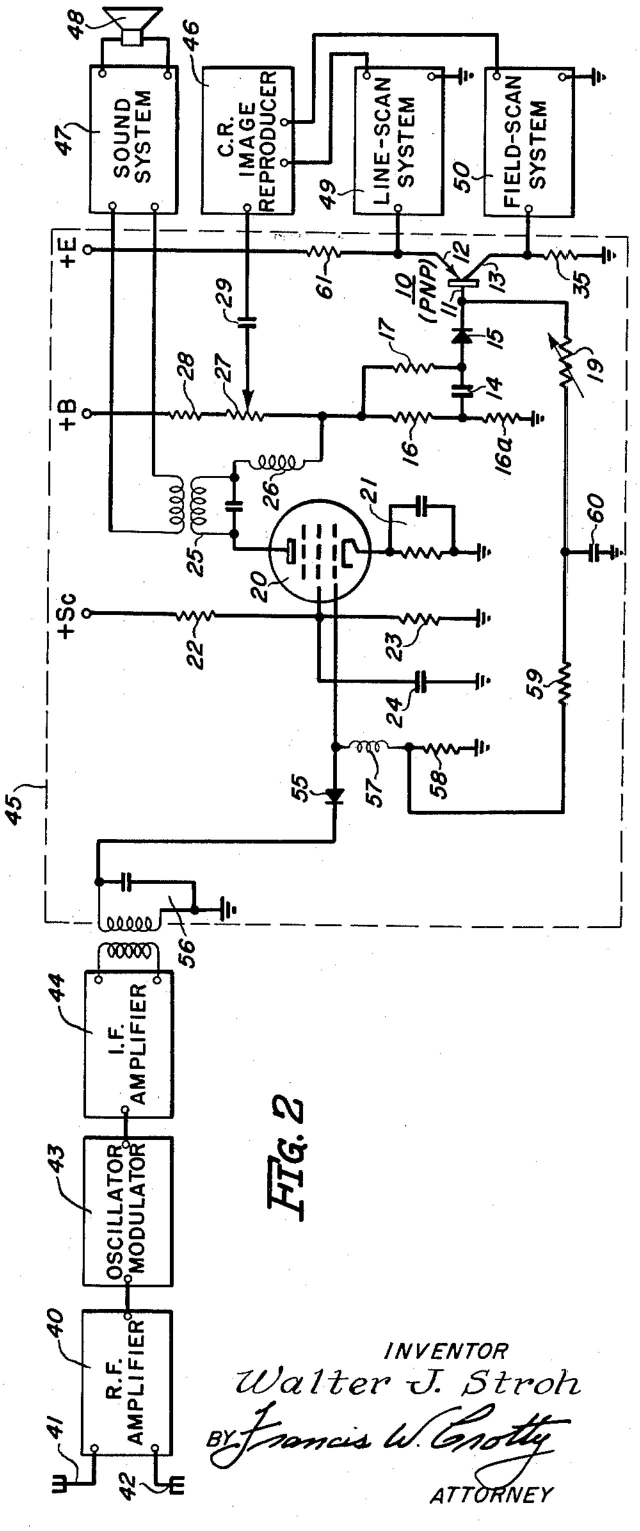

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elments, and in which:

FIGURE 1 is a schematic representation of one embodiment of a synchronizing-signal separator constructed in accordance with the invention; and FIGURE 2 represents a television receiver embodying a different form of the invention.

Referring now more particularly to FIGURE 1, the synchronizing-signal separator there represented comprises a transistor 10 of the PNP type, including a semi-conductor body having two P-type conductivity zones and one N-type conductivity zone which collectively constitute base-emitter and base-collector junctions. An inherent property of the semi-conductor is that its charge-storage characteristic, that is to say, the time during which a charge of minority carriers is retained within the device, is dependent upon or determined by operating bias. The bias is adjusted, as described presently, to relate the charge storage time in a particular manner to the duration of the synchronizing pulses. The transistor additionally has base, emitter and collector electrodes 11, 12 and 13, respectively, coupled in signal-translating relation to the junctions of the semi-conductor body.

Potential-supply means are provided for applying operating bias to the electrodes of the transistor to establish a saturation condition at the base-collector junction and also to establish, in conjunction with the characteristics of the transistor and its associated circuitry, a charge-storage time in the transistor which is long with respect to the line-synchronizing components of a received television signal, but short relative to each of the several pulses that comprise the serrated field-synchronizing component of that signal. The potential-supply means under consideration includes means for applying to one of the electrodes of the transistor a unidirectional or D.C. potential which varies in a particular manner with the video content of the television signal to the end that this potential variation may compensate potential variations experienced by the base electrode of the transistor through a signal-stabilizing device by means of which the television signal is applied to the transistor as explained more particularly hereinafter. More specifically, emitter electrode 12 receives a forward bias by a connection to some point in the television receiver which experiences the same potential variations that it is desirable to impose on the emitter. For example, the screen electrode of the video amplifier is suitable as a potential supply for the transistor and this is the arrangement that has been represented.

The video amplifier includes an electron-discharge device or tube 20 of the multi-electrode type, specifically a pentode tube. Its cathode is grounded through a self-biasing network 21 consisting of a resistor by-passed for signal frequencies. The first or control electrode of the tube is connected to a video detector 30. The screen electrode is connected to a source of unidirectional potential $+S_c$ through a screen dropping resistor 22, is returned to ground through a resistor 23 and is bypassed by a condenser 24. The suppressor electrode is connected to the cathode in the usual way and the anode is connected to a source of unidirectional operating potential +B through a tuned circuit 25, a series-peaking resistor 26, a contrast-control potentiometer 27, and a resistor 28. Tuned circuit 25 is resonant at a frequency of 4½ megacycles which corresponds to the frequency of the intercarrier component developed in video detector 30 in the reception of a television signal. The inductor of the resonant circuit may be one winding of a transformer, the other winding of which connects to the sound system of the receiver as indicated by the legend. The tap of contrast control 27 is coupled through a coupling condenser 29 to the input of a cathode-ray image reproducer (not shown).

A signal-stabilizing means, including a coupling condenser 14 and a series-connected diode 15, applies the television signal from video amplifier 20 to the base electrode of transistor 10 with a polarity and amplitude to bias the transistor to cut off in the presence of synchronizing components. In other words, the stabilizing circuit applies the television signal to the transistor with positive-going synchronizing-signal components. The connection from the stabilizing circuit to the output of the video amplifier is through an attenuating network comprising resistors 16 and 16*a* and resistor 17 constitutes a leak or discharge path for condenser 14.

In completing the circuitry of transistor 10, the base electrode is returned to ground through a resistor 18 and a variable resistor 19. In order to derive one of the two types of synchronizing components of the television signal, effectively separated from the other type of synchronizing component, a load impedance is connected with either the emitter or collector electrode. For the specific embodiment under consideration, a collector-load impedance 35 serves as the output for the synchronizing-signal separator.

In considering the operation of the described arrangement, it will be assumed that the potential applied to transistor 10, by way of the connection from emitter 12 to the screen electrode of video amplifier 20, forward biases the transistor and this bias, in conjunction with the associated circuitry, establishes saturation at the base-collector junction. The television signal, with positive-going synchronizing components and stabilized about the blanking level by the action of stabilizing circuit 14, 15, is applied to the base electrode to bias the transistor to cut off during the presence of synchronizing components. Since the storage time of the transistor exceeds the duration of line-synchronizing components, these components are not translated to collector-load impedance 35 in the same fashion that the field-synchronizing components are translated. In particular, while the saturation condition persists, the collector may be thought of as short-circuited to the base and, therefore, the collector tends to follow signal variations of the base electrode. However, the line-synchronizing components are reproduced with so little amplitude at the collector electrode that they may be ignored for present purposes.

Upon the receipt of the first pulse constituting the serrated field-synchronizing component, however, the charge storage is dissipated by recombination, absorption and the like and the transistor is, in fact, cut off within the pulse duration. When cut-off has been accomplished, the collector electrode falls in potential to ground, but the emitter and base electrodes, which are essentially at a common potential, are at a large potential difference with respect to the collector. This results in avalanche or breakdown of the transistor and the pulse developed by collector impedance 35 represents a large signal excursion in a negative direction relative to the normal potential of the collector. Consequently the field pulse is effectively separated from the line pulses and may be used directly. This phenomenon and explanatory curves illustrating the operation are more fully disclosed in the Isabeau application to which reference may be made for a more complete discussion. Suffice it to say at this juncture that the field pulses are effectively separated from the horizontal pulses because of the significantly different response in the collector circuit to the reception of pulses having a duration longer than the charge-storage time of the transistor.

As indicated hereinabove, the television signal translated by stabilizing circuit 14, 15 experiences a change in average value with picture content and this is reflected in a change in average potential of the base electrode of transistor 10. If it is not compensated, it causes an undesired variation in base-emitter potential of the transistor.

Effective compensation results from the expedient of energizing the emitter from the screen electrode of the video amplier. It will be understood that the space current in video amplifier 20 varies with video content or average brightness of the television signal so that both the screen and anode potentials of tube 20 likewise change with average brightness. The change in screen potential is, in effect, integrated at condenser 24 resulting in variations at emitter 12, which are of the same type as those experienced by base electrode 11. Proportioning resistors 16 and 16*a* of the attenuating network results in an equalization of the variations in average potential of the base and emitter electrodes and causes the transistor to suffer no net change in potential. Accordingly, the adverse influence otherwise attributable to the change in stabilization level with average brightness of video is obviated or minimized.

Instead of subjecting the emitter electrode to the same variations, similar in sense and magnitude to those experienced by the base electrode, the adverse influence of change in picture brightness may be counteracted by applying to the base electrode a component of potential which annuls this change. Correction of this type is accomplished in the embodiment of FIGURE 2.

The synchronizing signal separator in FIGURE 2 is incorporated in a television receiver of the intercarrier-sound type. The receiver comprises a radio-frequency amplier 40 of any desired number of stages having input terminals connected to an antenna system 41, 42. Connected in cascade with amplifier 40 are an oscillator-modulator 43, an IF amplifier 44 of any desired number of stages, a unit 45 to be considered more particularly hereinafter, and a cathode-ray image reproducer 46. An intercarrier component, derived in unit 45, is supplied to a sound system 47 having suitable stages of audio detection and amplification for driving a sound reproducer or loud speaker 48. Scanning signals required by image reproducer 46 are developed in a line-scanning system 49 and a field-scanning system 50, each of which has a synchronizing circuit connected to the signal separator of unit 45. Scanning signals from these systems are delivered to line and field-scanning coils customarily included within a yoke assembly (not shown) associated with image reproducer 46.

Neglecting for a moment the details of unit 45 and its particular operation, the arrangement will be seen to constitute a conventional intercarrier-sound receiver. Tuning devices included in R-F amplifier 40 and oscillator-modulator 43 are adjusted to select from antenna system 41, 42 any desired television signal for utilization. That signal, after amplification in amplifier 40, is converted in oscillator-modulator 43 to an intermediate-frequency signal and is applied to amplifier 44 for further amplification. After detection and additional amplification accomplished within unit 45, the video components are applied to image reproducer 46 to intensity modulate the cathode-ray beam thereof as it scans a succession of fields of parallel lines. The scanning process of the image reproducer is under the control of scanning signals delivered by line-scanning system 49 and field-scanning system 50. These systems, in turn, are synchronized by synchronizing components contained in the television signal, separated from the video information within unit 45 and applied to synchronizing circuits of the scanning systems. Synchronization of the scanning system properly relates the field scansion of the receiver with that of the transmitter as required to synthesize an image. As an incident to the video detection, a component referred to as an intercarrier-sound component is developed and amplified in video amplifier 20. This component is a 4½ megacycle signal frequency modulated with the sound accompanying the video program. The intercarrier component is derived by resonant circuit 25 and applied to sound system 47 to the end that reproducer 48 translates the sound concurrently with the reproduction of the image.

Reference is now made to the details of unit 45. It is obvious from inspection that this unit includes a video amplifier 20 and a synchronizing-signal separator 10 generally the same as that illustrated in FIGURE 1 so that it is only necessary to particularize as to their differences. Unit 45 further includes a video detector in addition to the video amplifier. That detector comprises a diode 55 having a tuned input 56 inductively coupled to the last stage of intermediate-frequency amplifier 44. The load circuit of the detector includes a series-peaking inductor 57 and a series-connected resistor 58. The circuit of base electrode 11 for this embodiment is completed through variable resistor 19, a filter resistor 59, and resistor 58 of the detector load. Shunt condenser 60, together with resistor 59, constitute a filter for removing video information in the connection to base electrode 11. A resistor 61 is connected in series with emitter 12 and constitutes a load which develops line, as distinguished from field, synchronizing components. Forward bias is applied to the emitter from a source of unidirectional potential +E.

The operation of the synchronizing-signal separator within unit 45 is precisely as described in conjunction with FIGURE 1 in effectively separating the field-synchronizing components at collector load 35. Separation of the line components occurs in the emitter circuit as follows.

At the time a synchronizing component is received, a saturation condition exists in the transistor and the emitter as well as the collector may be considered effectively short-circuited to the base. Accordingly, the emitter follows the signal variations of the base and the horizontal components are developed across emitter load 61. In the presence of a field pulse, the transistor becomes cut off and the stored carriers are swept out after a time interval which is only slightly larger than the horizontal components. The cut off condition returns emitter 12 to the potential of its source E and, therefore, the signal variation occasioned in impedance 61 is very similar to that experienced during the reception of the line-synchronizing signal components. Accordingly, separated line-synchronizing signal components are developed at load 61 while effectively separated field-synchronizing components are developed at collector load 35.

In the arrangement of FIGURE 2, the potential of emitter 12, being derived from source +E, is not ordinarily subject to variations with average brightness. However, the component of D.C. potential applied to base electrode 11 through filter 59, 60 does vary with average brightness, but its variations are opposite in sense to those imposed on the base electrode through the action of the stabilizing circuit. If resistors 16 and 16*a* of the attenuating network are properly selected, such variations annul one another at the base electrode. It should be noted in passing that the resistive components 19, 58 and 59 of the base circuit in FIGURE 2 are adjusted to approximate the same base circuit as that provided by resistors 18 and 19 of FIGURE 1.

Accordingly, the described arrangements effect synchronizing-signal separation and avoid adverse effects to which the separator is otherwise subjected because of the sensitiveness of the stabilizing circuit to changes in average brightness in the television signal.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A synchronizing-signal separator for a television receiver comprising: a transistor including a semi-conductor body having two conductivity zones of one type and another conductivity zone of opposite type constituting therewith base-emitter and base-collector junctions, having a charge-storage characteristic dependent upon operating bias and further having base, emitter and collector electrodes coupled in signal-translating relation to said junctions; potential-supply means for applying operating bias to said electrodes to establish a saturation condition at said base-collector junction and to establish in said transistor a charge-storage time long with respect to the line-synchronizing components of a television signal but short relative to the several pulses comprising the serrated field-synchronizing components of said signal, said potential-supply means including means for applying to one of said electrodes a D.C. potential which varies with the video content of said signal; signal-stabilizing means, including a coupling condenser and a series-connected diode, for applying said signal to said base electrode with a polarity and amplitude to bias said transistor to cut off in the presence of said synchronizing components and with said signal stabilized as to a reference amplitude level but subject to variations with video content to compensate said variations in said potential-supply means; and a load impedance series connected with one of said emitter and collector electrodes to derive one of said two types of synchronizing components effectively separated from the other.

2. A synchronizing-signal separator for a television receiver comprising: a transistor including a semi-conductor body having two conductivity zones of one type and another conductivity zone of opposite type constituting therewith base-emitter and base-collector junctions, having a charge-storage characteristic dependent upon operating bias and further having base, emitter and collector electrodes coupled in signal-translating relation to said junctions; potential-supply means for applying operating bias to said electrodes to establish a saturation condition at said base-collector junction and to establish in said transistor a charge-storage time long with respect to the line-synchronizing components of a television signal, but short relative to the several pulses comprising the serrated field-synchronizing components of said signal, said potential-supply means including means for applying to one of said electrodes a D.C. potential which varies with the video content of said signal; signal-stabilizing means including a coupling condenser and a series-connected diode, for applying said signal to said base electrode with a polarity and amplitude to bias said transistor to cut off in the presence of said synchronizing components and with said signal stabilized as to a reference amplitude level but subject to variations with video content to compensate said variations in said potential-supply means; and a load impedance series connected with said collector electrode to derive said field-synchronizing components effectively separated from said television signal.

3. A synchronizing-signal separator for a television receiver comprising: a video amplifier including an electron-discharge device of the multi-electrode type having one electrode biased to a particular operating potential but subject to variations in operating potential with video content of a television signal translated by the amplifier; a transistor including a semi-conductor body having two conductivity zones of one type and another conductivity zone of opposite type constituting therewith base-emitter and base-collector junctions, having a charge-storage characteristic dependent upon operating bias and further having base, emitter and collector electrodes coupled in signal-translating relation to said junctions; potential supply means, including a connection from said emitter electrode to said one electrode of said amplifier, for applying operating bias to said transistor electrodes to establish a saturation condition at said base-collector junction and to establish in said transistor a charge-storage time long with respect to the line-synchronizing components of a television signal but short relative to the several pulses comprising the serrated field-synchronizing components of said signal; signal-stabilizing means, including a coupling condenser and a series-connected diode, for applying said signal from said amplifier to said base electrode with a polarity and amplitude to bias said transistor to cut off in the presence of said synchronizing components and with said signal stabilized as to a reference amplitude level but subject to variations with video content to compensate potential variations of said emitter electrode; and a load impedance series connected with one of said emitter and collector electrodes to derive one of said two types of synchronizing components effectively separated from the other.

4. A synchronizing-signal separator for a television receiver comprising: a video amplifier including an electron-discharge device of the multi-electrode type having a screen biased to a particular operating potential but subject to variations in operating potential with video content of a television signal translated by the amplifier; a transistor including a semi-conductor body having two conductivity zones of one type and another conductivity zone of opposite type constituting therewith base-emitter and base-collector junctions, having a charge-storage characteristic dependent upon operating bias and further having base, emitter and collector electrodes coupled in signal-translating relation to said junctions; potential-supply means, including a connection from said emitter electrode to said screen of said amplifier, for applying operating bias to said transistor electrodes to establish a saturation condition at said base-collector junction and to establish in said transistor a charge-storage time long with respect to the line-synchronizing components of a television signal but short relative to the several pulses comprising the serrated field-synchronizing components of said signal; signal-stablizing means, including a coupling condenser and a series-connected diode, for applying said signal from said amplifier to said base electrode with a polarity and amplitude to bias said transistor to cut off in the presence of said synchronizing components and with said signal stablized as to a reference amplitude level but subject to variations with video content to compensate potential variations of said emitter electrode; and a load impedance series connected with one of said emitter and collector electrodes to derive one of said two types of synchronizing components effectively separated from the other.

5. A synchronizing-signal separator for a television receiver comprising: a transistor including a semi-conductor body having two conductivity zones of one type and another conductivity zone of opposite type constituting therewith base-emitter and base-collector junctions, having a charge-storage characteristic dependent upon operating bias and further having base, emitter and collector electrodes coupled in signal-translating relation to said junctions; potential-supply means for applying operating bias to said electrodes to establish a saturation condition at said base-collector junction and to establish in said transistor a charge-storage time long with respect to the line-synchronizing components of a television signal but short relative to the several pulses comprising the serrated field-synchronizing components of said signal, said potential-supply means including means for applying to said base electrode a D.C. potential which varies in a particular sense with the video content of said signal; signal-stabilizing means, including a coupling condenser and a series-connected diode, for applying said signal to said base electrode with a polarity and amplitude to bias said transistor to cut off in the presence of said synchronizing components and with said signal stabilized as to a reference amplitude level but subject to variations with video content in an opposite sense to compensate said variations in said potential supply means; and a load impedance series connected with one of said emitter and collector electrodes to derive one of said two types of synchronizing components effectively separated from the other.

6. A synchronizing-signal separator for a television receiver comprising: a video detector; a transistor including a semi-conductor body having two conductivity zones of one type and another conductivity zone of opposite type constituting therewith base-emitter and base-collector junctions, having a charge-storage characteristic dependent upon operating bias and further having base, emitter and collector electrodes coupled in signal-translating relation to said junctions; potential-supply means for applying operating bias to said electrodes to establish a saturation condition at said base-collector junction and to establish in said transistor a charge-storage time long with respect to the line-synchronizing components of a television signal but short relative to the several pulses comprising the serrated field-synchronizing components of said signal, said potential-supply means including means for deriving from said detector and for applying to said base electrode a D.C. potential which varies in a particular sense with the video content of said signal; signal-stabilizing means, including a coupling condenser and a series-connected diode, for applying said signal from said detector to said base electrode with a polarity and amplitude to bias said transistor to cut off in the presence of said synchronizing components and with said signal stabilized as to a reference amplitude level but subject to variations with video content in an opposite sense to compensate said variations in said potential supply means; and a load impedance series connected with one of said emitter and collector electrodes to derive one of said two types of synchronizing components effectively separated from the other.

7. A synchronizing-signal separator for a television receiver comprising: a video detector having a load circuit; a transistor including a semi-conductor body having two conductivity zones of one type and another conductivity zone of opposite type constituting therewith base-emitter and base-collector junctions, having a charge-storage characteristic dependent upon operating bias and further having base, emitter and collector electrodes coupled in signal-translating relation to said junctions; potential-supply means for applying operating bias to said electrodes to establish a saturation condition at said base-collector junction and to establish in said transistor a charge-storage time long with respect to the line-synchronizing components of a television signal but short relative to the several pulses comprising the serrated field-synchronizing components of said signal, said potential-supply means including a connection from said base electrode to said detector load circuit for applying to said base electrode a D.C. potential which varies in a particular sense with the video content of said signal; signal-stablizing means, including a coupling condenser and a series-connected diode, for applying said signal from said detector to said base electrode with a polarity and amplitude to bias said transistor to cut off in the presence of said synchronizing components and with said signal stabilized as to a reference amplitude level but subject to variations with video content in an opposite sense to compensate said variations in said potential supply means; and a load impedance series connected with one of said emitter and collector electrodes to derive one of said two types of synchronizing components effectively separated from the other.

References Cited in the file of this patent

UNITED STATES PATENTS 2,295,346 Jones ---------------- Sept. 8, 1942

FOREIGN PATENTS 742,336 Great Britain ----------- Dec. 21, 1955